US006961453B2

(12) United States Patent
Yoon et al.

(10) Patent No.: US 6,961,453 B2
(45) Date of Patent: Nov. 1, 2005

(54) METHOD FOR EXTRACTING FINGERPRINT FEATURE DATA USING RIDGE ORIENTATION MODEL

(75) Inventors: Jun Sung Yoon, Seoul (KR); Dong Hun Kim, Seoul (KR); Chul Min Joe, Seoul (KR); Soon Won Jung, Seocho-gu (KR); Hwi Seok Lee, Seoul (KR); Byun Jin Lee, Kwachon (KR); Dong Won Lee, Gyunggi (KR); Taek Ki Lee, Seoul (KR)

(73) Assignee: Secugen Corporation, Santa Clara, CA (US)

( * ) Notice: Subject to any disclaimer, the term of this patent is extended or adjusted under 35 U.S.C. 154(b) by 573 days.

(21) Appl. No.: 09/994,173

(22) Filed: Nov. 26, 2001

(65) Prior Publication Data

US 2003/0076986 A1 Apr. 24, 2003

(51) Int. Cl.[7] .................................................. G06K 9/00
(52) U.S. Cl. ........................ 382/125; 340/5.83; 902/3
(58) Field of Search ................................ 382/115–127; 356/71; 340/5.52, 5.53, 5.8–5.83; 902/3, 5; 238/68

(56) References Cited

U.S. PATENT DOCUMENTS

| 3,859,633 A | 1/1975 | Ho et al. |
| 3,893,080 A | 7/1975 | Ho et al. |
| 3,944,978 A | 3/1976 | Jensen et al. |

(Continued)

FOREIGN PATENT DOCUMENTS

| EP | 0 617 919 A2 | 10/1994 |
| EP | 0 847 024 A2 | 6/1998 |
| EP | 0 847 024 A3 | 6/1998 |
| JP | 61221883 | 10/1986 |
| JP | 7131322 | 5/1995 |
| WO | WO 98/11478 A2 | 3/1998 |
| WO | WO 98/11501 A3 | 3/1998 |
| WO | WO 98/11501 A2 | 3/1998 |
| WO | WO 98/11750 A2 | 3/1998 |
| WO | WO 98/35118 A1 | 8/1998 |

OTHER PUBLICATIONS

"A Nonlinear Orientation Model for Global Description of Fingerprints" Vizcaya et al., Pattern Recognition, v. 29, No. 7, 1996, pp. 1221–1231.*

"A Model For Interpreting Fingerprint Topology" by Sherlock et al., Pattern Recognition, v. 26, No. 7, 1993, pp. 1047–1095.*

Ahn, D–S. et al. (Date Unknown), "Automatic Real–Time Identification of Fingerprint Images Using Block–FFT," "Source unknown, pp:1–25, (English Abstract only.).

Author Unknown (Date Unknown). "An Algorithm For Filtering False Minutiae in Fingerprint Recognition and Its Performance Evaluation," (Source Unknown) pp. 1–34 (English Abstract only.).

Califano, A. et al. (1994). "Multidimensional Indexing For Recognizing Visual Shapes," *IEEE Transactions on Pattern Analysis and Machine Intelligence* 16(4):373–392.

(Continued)

*Primary Examiner*—Jon Chang
*Assistant Examiner*—Charles Kim

(57) ABSTRACT

The disclosed invention herein is a method for extracting fingerprint feature data using a ridge orientation model. The fingerprint feature data extracting method includes the steps of inputting a fingerprint image, extracting ridge orientations according to regions, calculating ridge qualities according to regions and separating background region from the fingerprint image, extracting regions having a core and a delta, setting an initial ridge orientation model, calculating a ridge orientation function, and extracting the ridge orientations and the core and delta positions of the fingerprint image.

10 Claims, 9 Drawing Sheets

U.S. PATENT DOCUMENTS

| | | |
|---|---|---|
| 3,959,884 A | 6/1976 | Jordan et al. |
| 4,015,240 A | 3/1977 | Swonger et al. |
| 4,047,154 A | 9/1977 | Vitols et al. |
| 4,135,147 A | 1/1979 | Riganati et al. |
| 4,151,512 A | 4/1979 | Riganati et al. |
| 4,156,230 A | 5/1979 | Riganati et al. |
| 4,185,270 A | 1/1980 | Fischer II et al. |
| 4,208,651 A | 6/1980 | McMahon |
| 4,210,899 A | 7/1980 | Swonger et al. |
| 4,225,850 A | 9/1980 | Chang et al. |
| 4,310,827 A | 1/1982 | Asai |
| 4,414,684 A | 11/1983 | Blonder |
| 4,525,859 A | 6/1985 | Bowles et al. |
| 4,541,113 A | 9/1985 | Seufert et al. |
| 4,581,760 A | 4/1986 | Schiller et al. |
| 4,607,384 A | 8/1986 | Brooks |
| 4,641,350 A | 2/1987 | Bunn |
| 4,646,352 A | 2/1987 | Asai et al. |
| 4,668,995 A | 5/1987 | Chen et al. |
| 4,685,145 A | 8/1987 | Schiller |
| 4,747,147 A | 5/1988 | Sparrow |
| 4,752,966 A | 6/1988 | Schiller |
| 4,790,564 A | 12/1988 | Larcher et al. |
| 4,811,414 A | 3/1989 | Fishbine et al. |
| 4,817,183 A | 3/1989 | Sparrow |
| 4,872,203 A | 10/1989 | Asai et al. |
| 4,876,726 A | 10/1989 | Capello et al. |
| 4,896,363 A | 1/1990 | Taylor et al. |
| 4,933,976 A | 6/1990 | Fishbine et al. |
| 4,944,021 A | 7/1990 | Hoshino et al. |
| 4,947,442 A | 8/1990 | Tanaka et al. |
| 4,983,036 A | 1/1991 | Froelich |
| 5,040,223 A | 8/1991 | Kamiya et al. |
| 5,040,224 A | 8/1991 | Hara |
| 5,054,090 A | 10/1991 | Knight et al. |
| 5,105,467 A | 4/1992 | Kim et al. |
| 5,109,428 A | 4/1992 | Igaki et al. |
| 5,140,642 A | 8/1992 | Hsu et al. |
| 5,177,792 A | 1/1993 | Morita |
| 5,187,747 A | 2/1993 | Capello et al. |
| 5,210,797 A | 5/1993 | Usui et al. |
| 5,337,369 A | 8/1994 | Shibuya |
| 5,351,304 A | 9/1994 | Yamamoto |
| 5,497,429 A | 3/1996 | Shibuya |
| 5,537,484 A | 7/1996 | Kobayashi |
| 5,555,314 A | 9/1996 | Nakajima |
| 5,572,597 A | 11/1996 | Chang et al. |
| 5,613,014 A | 3/1997 | Eshera et al. |
| 5,631,971 A | 5/1997 | Sparrow |
| 5,631,972 A | 5/1997 | Ferris et al. |
| 5,633,947 A | 5/1997 | Sibbald |
| 5,635,723 A | 6/1997 | Fujieda et al. |
| 5,659,626 A | 8/1997 | Ort et al. |
| 5,717,777 A | 2/1998 | Wong et al. |
| 5,717,786 A | 2/1998 | Kamei |
| 5,740,276 A | 4/1998 | Tomko et al. |
| 5,799,098 A | 8/1998 | Ort et al. |
| 5,812,252 A | 9/1998 | Bowker et al. |
| 5,825,907 A | 10/1998 | Russo |
| 5,832,102 A | 11/1998 | Uchida |
| 5,841,888 A | 11/1998 | Setlak et al. |
| 5,845,005 A | 12/1998 | Setlak et al. |
| 5,848,176 A | 12/1998 | Hara et al. |
| 5,864,296 A | 1/1999 | Upton |
| 5,878,158 A | 3/1999 | Ferris et al. |
| 5,883,971 A | 3/1999 | Bolle et al. |
| 5,901,239 A | 5/1999 | Kamei |
| 5,909,501 A | 6/1999 | Thebaud |
| 5,915,035 A | 6/1999 | Hsiao et al. |
| 5,917,928 A | 6/1999 | Shpuntov et al. |
| 5,926,555 A | 7/1999 | Ort et al. |
| 5,933,515 A | 8/1999 | Pu et al. |
| 5,933,516 A | 8/1999 | Tu et al. |
| 5,937,082 A | 8/1999 | Funada |
| 5,960,101 A | 9/1999 | Lo et al. |
| 5,963,657 A | 10/1999 | Bowker et al. |
| 5,974,163 A | 10/1999 | Kamei |
| 5,982,913 A | 11/1999 | Brumbley et al. |
| 5,982,914 A | 11/1999 | Lee et al. |
| 5,987,156 A | 11/1999 | Ackland et al. |
| 5,991,408 A | 11/1999 | Pearson et al. |
| 5,995,630 A | 11/1999 | Borza |
| 5,995,640 A | 11/1999 | Bolle et al. |
| 5,995,641 A | 11/1999 | Yamaguchi |
| 5,995,642 A * | 11/1999 | Hsu et al. .................. 382/124 |
| 6,002,784 A | 12/1999 | Sato |
| 6,002,785 A | 12/1999 | Ucida |
| 6,002,787 A | 12/1999 | Takhar et al. |
| 6,005,963 A * | 12/1999 | Bolle et al. ................. 382/124 |

OTHER PUBLICATIONS

Hoshino, S. et al. (2001). "Mapping a Fingerprint Image to an Artificial Finger," *The Institute of Electronics, Information and Communication Engineers* pp. 53–60 (English Abstract only.).

Park, G–T., et al. (May 7, 1990). "Auto–Tuning PI Control by Pattern Recognition," *Auto–Tuning PI*, pp. 510–513. (English Abstract only.).

Park, Y.T. (Sep., 2000). "Robust Fingerprint Verification by Selective Ridge Matching," (Source Unknown), pp. 351–358. (English Abstract only.).

Vizcaya, P.R. et al. (1996). "A Nonlinear Orientation Model For Global Description of Fingerprints," *Pattern Recognition* 29(4):1221–1231.

* cited by examiner

[x] REGION WITH NEGATIVE COEFFICIENT VALUE
[ ] REGION WITH POSITIVE CO[EFFICIENT VALUE]

METHOD FOR EXTRACTING FINGERPRINT FEATURE DATA USING RIDGE ORIENTATION MODEL

PRIORITY INFORMATION

This application claims priority under 35 U.S.C. §119 to Korean Patent Application Number 2001-053110 filed Aug. 31, 2001 in the Republic of Korea.

BACKGROUND OF THE INVENTION

1. Field of the Invention

The present invention relates generally to a fingerprint recognition method, and more particularly to a method for extracting the ridge orientations, and core and delta positions of a fingerprint, by using a ridge orientation model with the regional ridge orientation information and entire ridge orientation information of a fingerprint image.

2. Description of the Prior Art

As well known to those skilled in the art, fingerprint recognition is one of security authentication technologies based on biological information. A fingerprint recognition technology is used to recognize a fingerprint having unique features for each person by an image processing method, and determine whether the recognized fingerprint is a registered person's. In the fingerprint recognition technology, the most significant aspect is a process of extracting the minutiae of a fingerprint and generating fingerprint feature data. The process of generating the fingerprint feature data is described in brief as follows. First, a fingerprint acquisition device reads a fingerprint and obtains a fingerprint image. The fingerprint image obtained by the fingerprint acquisition device is divided into a plurality of regions. Thereafter, the orientation values of fingerprint ridges are extracted according to the regions, and then the grayscale values of the ridges are binarized using directional masks. Further, each ridge is thinned into a single line (or skeleton), and minutiae are extracted from thinned ridges. In this case, erroneous minutiae (pseudo minutiae) are removed from the minutiae, and the positions and directions of the correct minutiae are formed into fingerprint feature data.

FIG. 1a is a view showing the bifurcation and ending point of fingerprint minutiae, and FIG. 1b is a fingerprint image view showing the core and delta of fingerprint minutiae.

Referring to FIG. 1a, a bifurcation 21 and an ending point 22 are used as the minutiae of a fingerprint. The bifurcation 21 is a point where the fingerprint ridge is branched, and the ending point 22 is a point where the fingerprint ridge is terminated. Further, a core 23 and a delta 24 shown in FIG. 1b are also used as the minutiae of a fingerprint. The numbers of the cores and the deltas are only zero, one, or two each in any one fingerprint, and there is no other numbers of the cores and the deltas in any one fingerprint. The core 23 and the delta 24 may be recognized with the naked eyes, and have been long used as the references of various fingerprint-classifying methods.

FIG. 2 is a flowchart of a conventional fingerprint minutia extracting method. FIG. 3a is an example view showing eight directional masks, and FIG. 3b is an example view showing the application of directional masks to a fingerprint region.

With reference to FIG. 2, there will be described in detail a conventional fingerprint minutia extracting method, particularly a method for extracting the ending point and bifurcation of fingerprint ridges as minutiae. A fingerprint image is inputted through a fingerprint acquisition device at step 11. At step 12 of extracting and correcting a ridge orientation, the entire fingerprint image is divided into square regions, each with a predetermined size. An orientation having a smallest brightness variation in each region is designated as a ridge orientation in a corresponding region. In order to correct the ridge orientation, the orientation value of a corresponding region is determined by averaging the orientation of the corresponding region and the orientations of its surrounding regions. At step 13, a binarization process is performed using orientation information as follows. For each pixel P, each grayscale, value in a region, of which the center is the pixel P and the size is the same size as a directional mask, is multiplied by a correspondent coefficient of directional mask corresponding to the direction at the center point of the region among masks 25a to 25h (a mask 25h is used in FIG. 3b). At this time, if the summation of the multiplied result is a positive value, the pixel P is in a ridge of the fingerprint and the pixel P is converted to "1". If it is a negative value, the pixel P is in a valley of the fingerprint, and the pixel P is converted to "0". FIG. 4 is a view showing a thinning process, and FIGS. 5a and 5b are views showing the principle of finding minutiae in a thinned image. At thinning step 14, in order to determine a skeleton of the ridge in the binary image having a constant ridge width as shown in FIG. 4, an outline of the ridge is converted into a valley until the width of the ridge becomes to "1" (in other words, when a skeleton of the ridge remains only). Finally, at the step 15 of extracting minutia positions and its directions, with respect to a point at which a value is "1" in the thinned image, the number of regions where a transition between "1" and "0" in adjacent arbitrary two points among the neighboring eight points appears is counted (a boundary of regions represented with dotted lines in FIGS. 5a and 5b). When the counted numbers are 2, 4, 6, and 8, respectively, the center points corresponding to the counted numbers are respectively classified into an ending point, a ridge, a bifurcation, and a cross point. FIG. 5a shows an ending point having a ridge direction from the left to the right, and FIG. 5b shows a bifurcation having a ridge direction from the left to the right. Finally, the ending and the bifurcation are used as the most important feature for distinguishing the fingerprints from one other.

The accuracy of the conventional method is relatively high. However, the conventional method for extracting the ridge orientation is disadvantageous in that it extracts the ridge orientation according to regions divided in the fingerprint image and it determines representative orientations according to regions, such that a fine variation of a orientation in a region cannot be exactly represented. Further, under the provision that the ridge orientation is not rapidly changed, the conventional method evaluates the average of ridge orientations of neighboring regions around each region, and corrects a orientation value using the average. However, such a provision cannot be adapted to regions near a core or a delta where the ridge is rapidly changed in orientation. Moreover, the orientation of a region with a tiny wound or a wrinkle on a fingerprint can be corrected by predicting a ridge orientation from the ridge orientations of neighboring regions. However, if the wounded part is large, it is impossible to find an exact ridge orientation. Such problems are due to a fact that the extraction and correction of the ridge orientation are only based on local image information.

Further, a conventional core and delta extracting method calculates positions of the core and the delta by detecting a directional variation in local regions. Therefore, such a method is disadvantageous in that it cannot extract the exact positions of the core or the delta, or cannot find the exact position at all, in a fingerprint image with a wound near the core or the delta. In addition, the conventional method is also disadvantageous in that it calculates the positions of the core and the delta using the orientation values mainly calculated according to regions, such that accuracy of the positions depends on a size of a region for calculating the orientations.

As described above, the conventional computer-aided method for extracting the ridge orientation and the core and delta positions has the basic limitation for lack of the information about entire ridge flow. As an example, a fingerprint expert knows a variety of types of fingerprints. Even if some regions of the fingerprint are damaged, the fingerprint expert can recognize an entire ridge flow from ridge orientations in undamaged regions of the fingerprint. Thereby, the expert can find a precise ridge orientation of the damaged region, and extract the precise positions of the core and delta, even if the regions near the core and the delta are damaged.

Therefore, in order to solve the above problems in the conventional computer-aided algorithm, there is required a method for extracting minutiae in consideration of the entire shape (flow) of the fingerprint as well as its local region.

SUMMARY OF THE INVENTION

Accordingly, the present invention has been made keeping in mind the above problems occurring in the prior art, and an object of the present invention is to provide to a method for extracting the ridge orientations and core and delta positions of a fingerprint using a ridge orientation model with the regional ridge orientation information and entire ridge orientation information of a fingerprint image.

In order to accomplish the above object, the present invention provides a method for extracting fingerprint feature data using a ridge orientation model, comprising the steps of scanning a fingerprint of a person requiring a fingerprint recognition with a fingerprint input device, and converting the fingerprint into a digital fingerprint image of predetermined format; dividing the digital fingerprint image into a plurality of regions, each with a predetermined size, and calculating ridge orientations in the regions; calculating qualities of ridges according to regions and separating the fingerprint image into a fingerprint region and a background region according to the calculated ridge qualities; evaluating and extracting positions of a core and a delta or regions with a core or delta in the fingerprint region; determining the candidate positions of the core and the delta within and outside the fingerprint region from the extracted positions of the cores and deltas in the previous step, and setting the determined candidate positions as initial parameters of an initial ridge orientation model for the core and delta; calculating a ridge orientation function by calculating parameters with a minimum error between ridge orientation values of the initial ridge orientation model and ridge orientation values of regions with quality higher than a threshold; and calculating ridge orientation values in all regions using the ridge orientation function, and deciding and extracting the positions of the core and the delta from the parameters for core and delta of the ridge orientation function.

According to the present invention, the method sets a model for representing entire feature data contained in a ridge flow of a fingerprint, and obtains a ridge orientation function by selectively utilizing information extracted from divided regions according to the model. Therefore, the exact orientations of the fingerprint ridges at all positions and exact positions of cores and deltas can be found. Further, the ridge orientations of the entire fingerprint image are represented as a few parameters constituting the ridge orientation function, thus enabling ridge orientation information to be compressed. Accordingly, the ridge orientations of the entire fingerprint image may be used as feature data in the process of fingerprint classification or fingerprint recognition.

BRIEF DESCRIPTION OF THE DRAWINGS

The above and other objects, features and other advantages of the present invention will be more clearly understood from the following detailed description taken in conjunction with the accompanying drawings, in which:

FIG. 11b is a view showing an initial ridge orientation model processed from the fingerprint image of FIG. 11a.

DESCRIPTION OF THE PREFERRED EMBODIMENTS

Figure 1A:
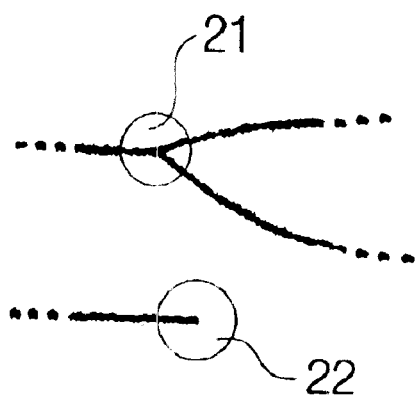
FIG. 1a is a view showing a bifurcation and an ending point of fingerprint minutiae.
Figure 1B:
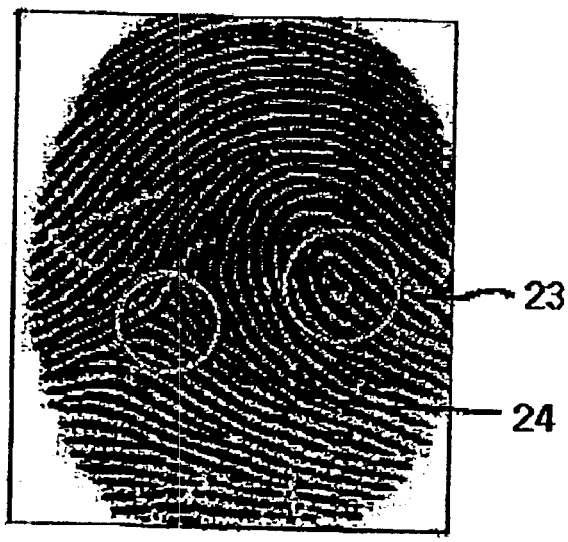
FIG. 1b is a fingerprint image view showing a core and a delta of fingerprint minutiae.
Figure 2:
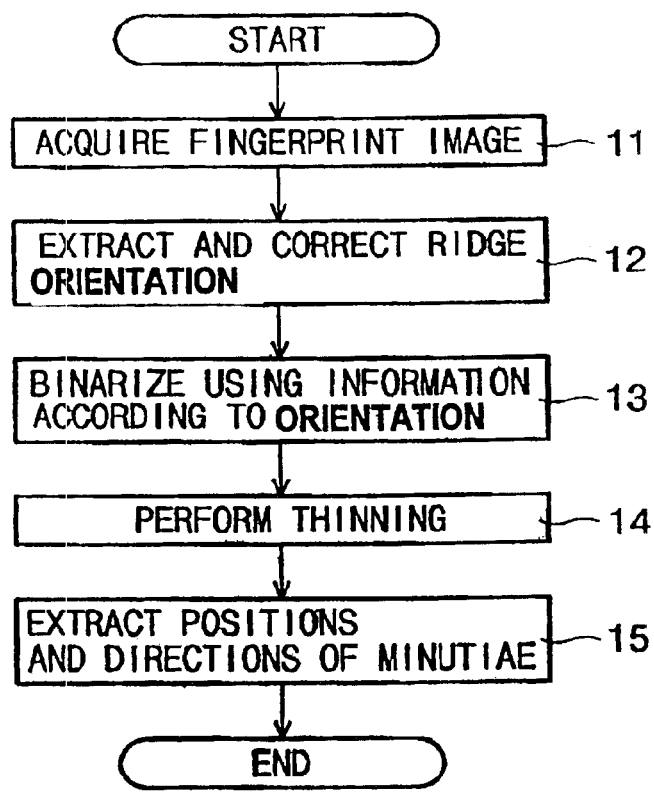
FIG. 2 is a flowchart of a conventional method for extracting fingerprint feature data.
Figure 3A:
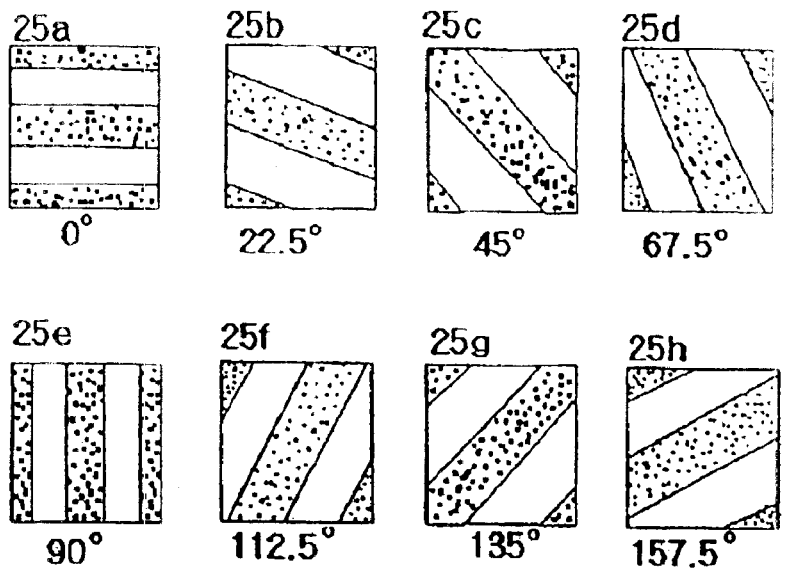
FIG. 3a is an example view showing eight directional masks.
Figure 3B:
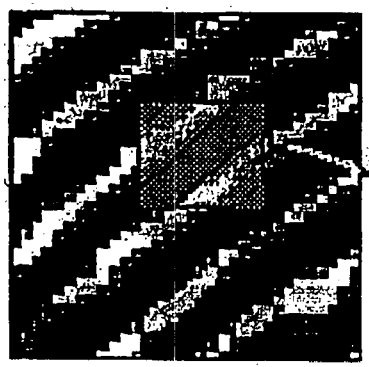
FIG. 3b is an example view showing the application of directional masks to a fingerprint region.
Figure 4:
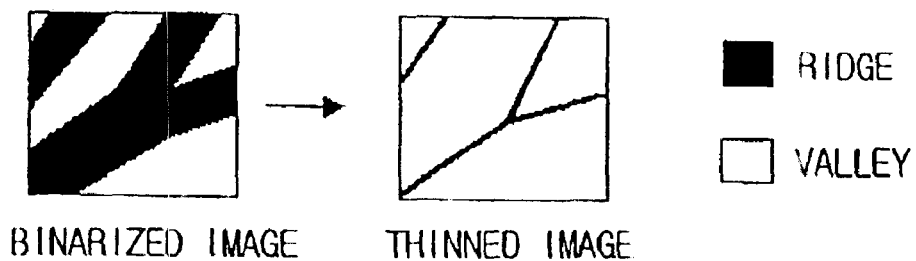
FIG. 4 is a view showing the thinning process.
Figure 5:
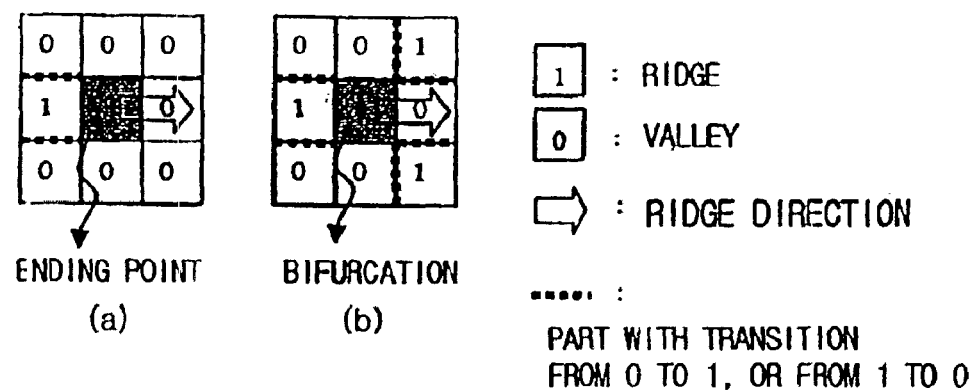
FIGS. 5a and 5b are views showing the principle for finding minutiae in a thinned image.
Figure 6:
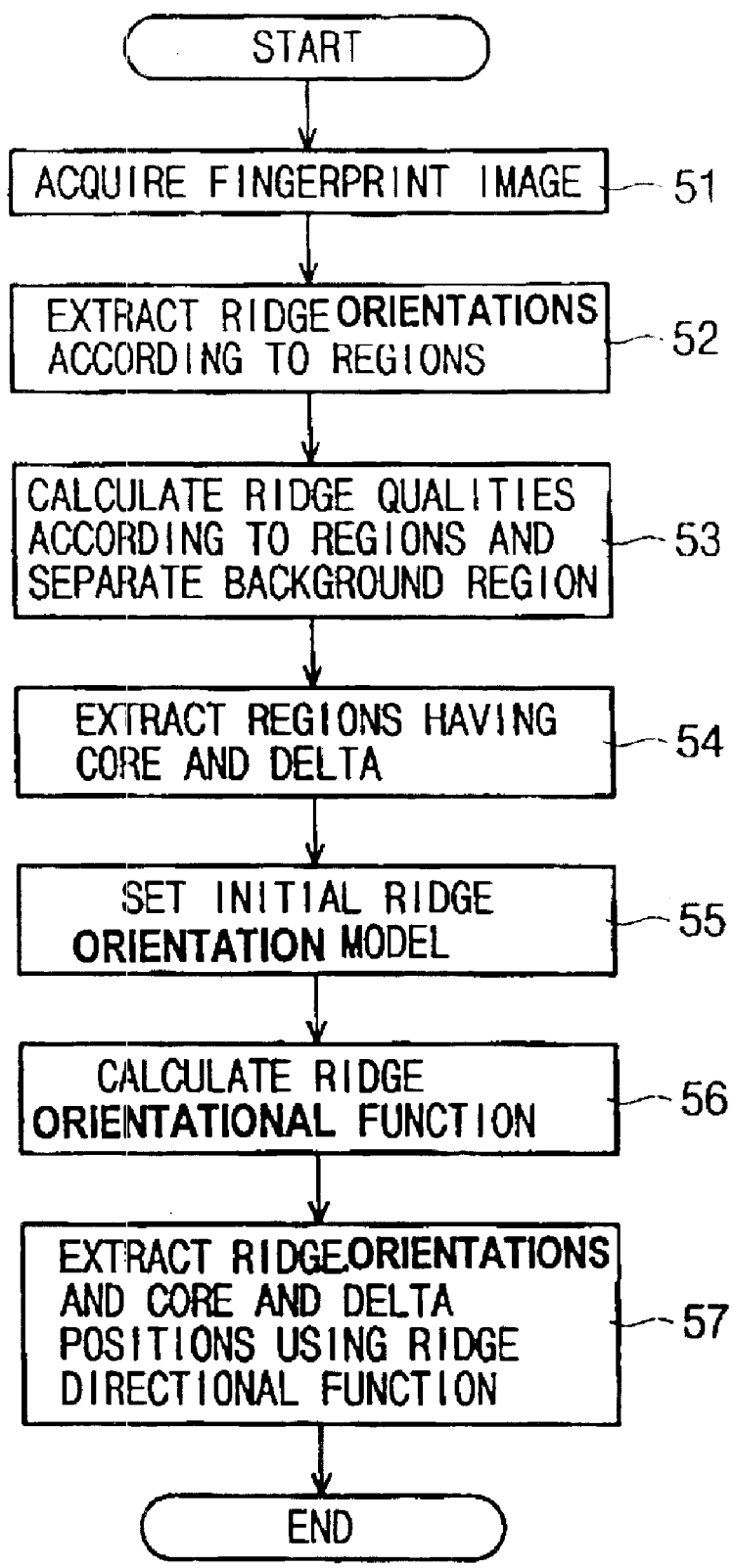
FIG. 6 is a flowchart of a method for extracting fingerprint feature data according to the present invention.

FIG. 6 is a flowchart of a method for extracting the ridge orientations and core and delta positions of a fingerprint in accordance with the present invention. Referring to FIG. 6, the method comprises the steps of acquiring a fingerprint image (step 51), extracting ridge orientations according to regions (step 52), calculating ridge qualities according to regions and separating background region from the fingerprint image (step 53), extracting regions having a core and a delta (step 54), setting an initial ridge orientation model (step 55), calculating a ridge orientation function (step 56), and extracting the ridge orientations and the core and delta positions of the fingerprint image (step 57).

At step 51, a fingerprint acquisition device scans a fingerprint of a person requiring fingerprint recognition, and the acquired fingerprint is converted to a digital fingerprint image of predetermined format.

At step 52, similarly to a conventional method, the fingerprint image is divided into a plurality of regions, each with a predetermined size, and ridge orientations are calculated at the regions. In other words, the entire region of the fingerprint image is divided into square blocks, each with a predetermined size, and a ridge orientation $O(x,y)$ is calculated with respect to each point $P(x,y)$ in each square block using the following Equation [1]. In this case, a orientation that the most points in each square block have among all orientations is determined as a representative ridge orientation of the block.

$$O(x, y) = \min_{\theta} \left[ \sum_{i=-n}^{n-1} |P_i^\theta - P_{i+1}^\theta| \right] \quad [1]$$

In Equation (1), $P^{\theta i}$ is a gray level at a position of (x+di cos θ,y+di sin θ), and θ is $$k\frac{\pi}{8},$$

where k is 0, 1, 2, . . . , 7 and d is the average distance between a ridge and a valley.

Figure 7:
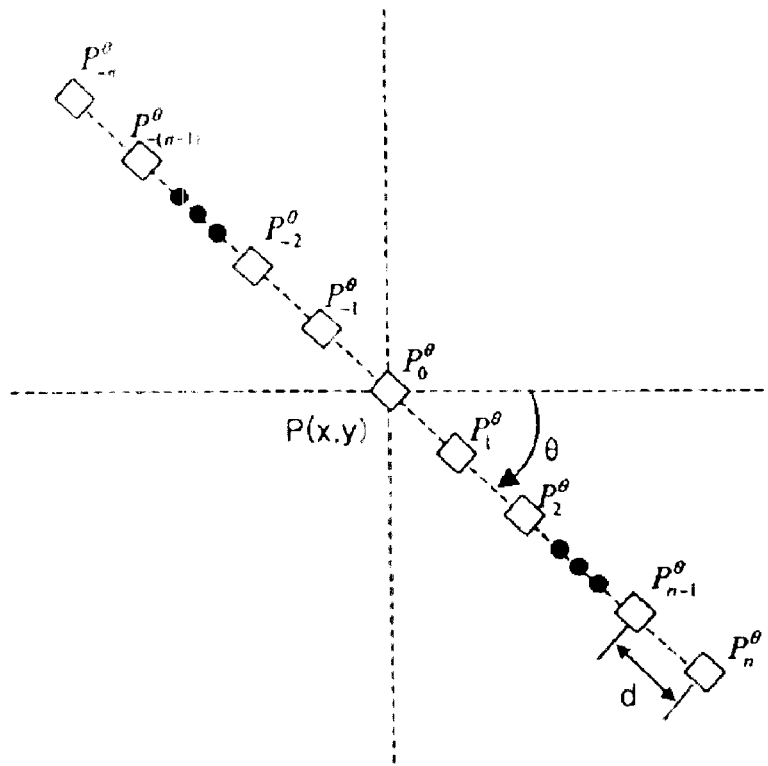
FIG. 7 is an example view showing a mask for extracting ridge orientations of this invention.

FIG. 7 is an example view showing a orientation mask for extracting ridge orientations and, particularly, FIG. 7 shows positions for points $P_{-n}$ to $P_n$ with respect to θ. In Equation [1], d is a half of an average distance between adjacent ridges in order that the periodicity of the ridges can be maximally reflected on the calculation of the ridge orientation O(x,y). Further, the ridge orientation can be calculated with respect to some points and not all points in the block to improve a calculation speed.

At step 53, the quality of the fingerprint image in each region is determined according as how satisfactorily the ridge represents typical ridge features, and the each region in image is separated into a fingerprint region and a background region according to the calculated quality.

The typical ridges have a periodicity that there is a constant distance between any two adjacent ridges, and have constant directionality in a narrow region. Therefore, it is assumed that the typical ridges may constitute a wave whose section forms a shape of sine wave and which is extended in a single orientation, as shown in FIG. 8.

Figure 8:
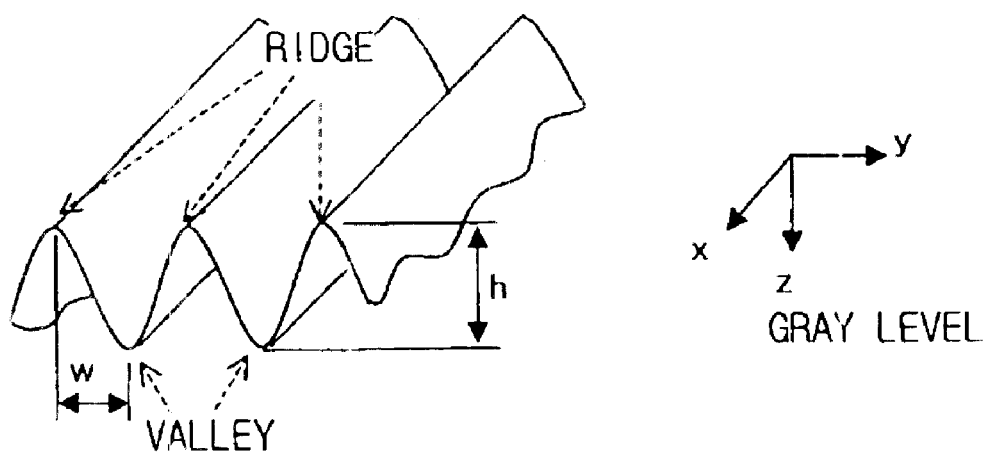
FIG. 8 is a view showing an ideal ridge model of this invention.

FIG. 8 is a view showing an ideal ridge model in accordance with this invention. According to the assumption, the more a gray level difference (h in FIG. 8) between a ridge and a valley is increased, the periodicity of the ridges is increased (in other words, the more w of FIG. 8 is similar to the average distance between the ridge and the valley) and the directionality of the ridges is constant, the higher the ridge qualities according to regions are.

From the sine wave model shown in FIG. 8, it is deduced that the larger a difference between a gray level difference in the orientation with a minimum gray level difference and a gray level difference in orientation with a maximum gray level difference is, the better the ridge quality is. In order to evaluate the ridge quality, the method of the present invention uses the following Equation [2], $$A = \sum_{i=-n}^{n-1} |P_i^{\theta a} - P_{i+1}^{\theta a}| \quad [2]$$

$$B = \sum_{i=-n}^{n-1} |P_i^{\theta b} - P_{i+1}^{\theta b}|$$

where, $\theta a = \min_{\theta} \sum_{i=-n}^{n-1} |P_i^\theta - P_{i+1}^\theta|, \theta b = \max_{\theta} \sum_{i=-n}^{n-1} |P_i^\theta - P_{i+1}^\theta|,$ $P^\theta_i$ is a gray level at a position of (x+wi cos θ,y+wi sin θ) and w is an average distance between a ridge and a valley. In Equation [2], A is a gray level difference in a longitudinal orientation of the ridges (x direction of FIG. 8), and B is a gray level difference in the lateral orientation of the ridges (y direction of FIG. 8). In the case that A is smaller and B is larger, a ridge quality at an arbitrary point is higher. Namely, the ridge quality at P(x,y) is directly proportional to the difference between A and B. The quality of each block is calculated as an average quality of points in the block.

Figure 9A:
FIG. 9a is a view showing a fingerprint image with damaged parts.
Figure 9B:
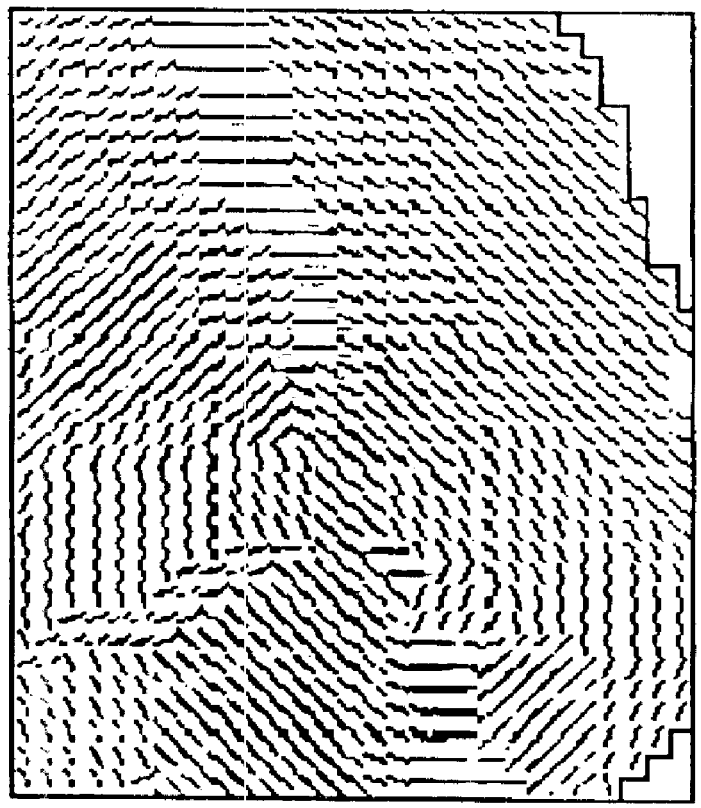
FIG. 9b is view showing the image after ridge orientation extraction, quality calculation and background separation are processed on the fingerprint image of FIG. 9a of this invention.

Further, a region where A and B have a low value, in other words, a region having a ridge quality lower than a predetermined threshold, is classified as a background region at step 53. But, the background regions surrounded by foreground (fingerprint) regions are classified as fingerprint region. FIGS. 9a and 9b show that the regions in the right side of the fingerprint image shown in FIG. 9a are represented as the background region as shown in FIG. 9b.

As an example, FIG. 9a is a view showing a fingerprint image with damaged parts, and FIG. 9b is view showing the image obtained after ridge orientation extraction, quality calculation and background separation are performed on the fingerprint image of FIG. 9a.

Referring to FIG. 9a, a reference numeral 60 represents some parts with a poor ridge quality in a fingerprint region. The parts 60 are portions where the fingerprint is damaged, and is not classified as the background region but as the fingerprint region as shown in FIG. 9b (referring to FIG. 9b, regions indicated with the circles of FIG. 9a are processed as fingerprint parts). Here, it is well known in the field that even if these parts have a poor quality, the part is processed not as a background region, but as a fingerprint region.

Referring to FIG. 6 again, at step 54, the positions or parts where a core or a delta is positioned are determined.

Figure 10A:
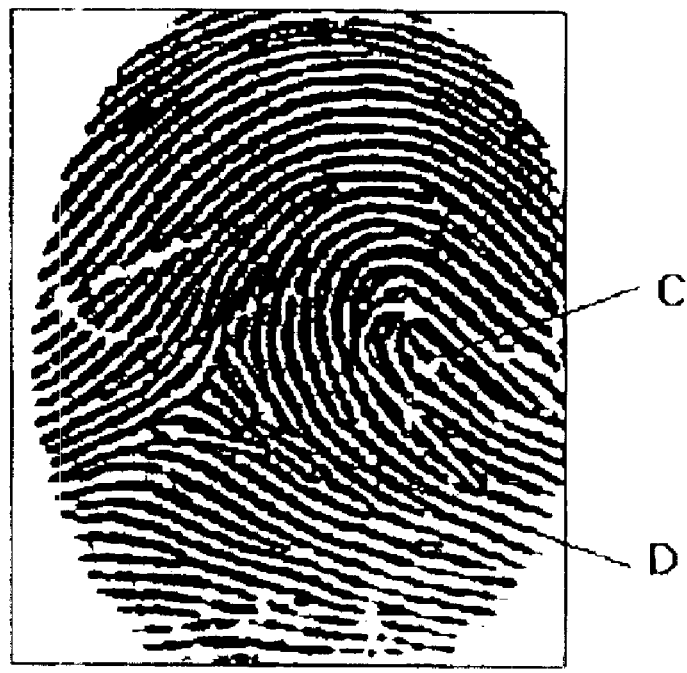
FIG. 10a is a view showing a fingerprint image having a core and a delta.
Figure 10B:
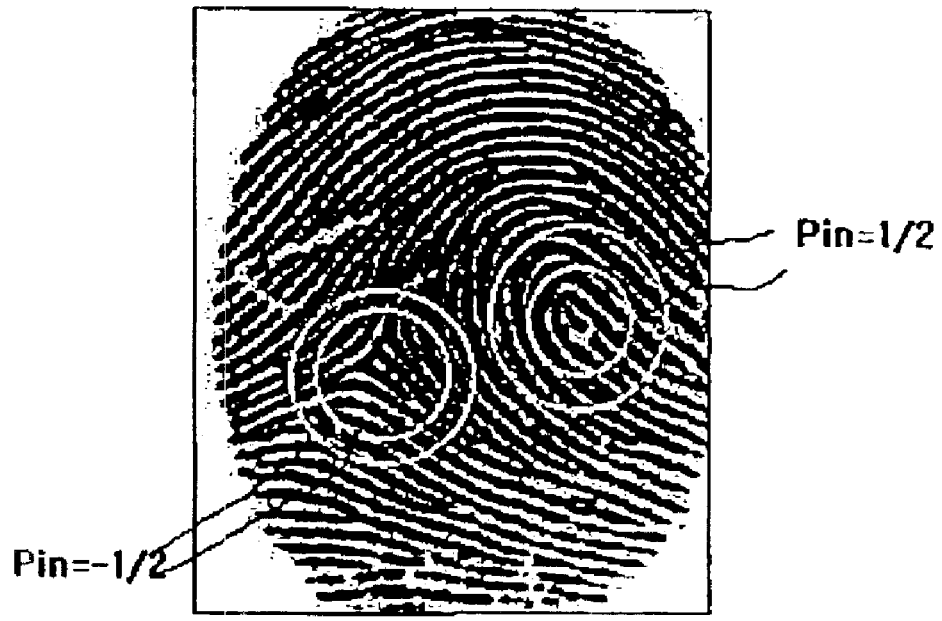
FIG. 10b is a view showing a Poincare index with respect to the core and the delta.

FIG. 10a is a view showing a fingerprint image having a core and a delta, and FIG. 10b is a view showing a Poincare index with respect to the core and the delta. Referring to FIG. 10a, the positions of the core and the delta can be found using a property that the ridge orientations in a core part C and a delta part D are changed in a orientation indicated by the arrows of FIG. 10a. More specifically, referring to FIG. 10b, the positions of the core and the delta can be obtained by calculating the Poincare Index ($P_{in}$) of the following Equation [3] with respect to an arbitrary region, by using a fact that orientation values in regions having a core and a delta are respectively changed by λ, and −π. Therefore, regions having the core and the delta are evaluated. The Poincare Index at a point is a value obtained by integrating differences of ridge orientations along a boundary of region including the point.

$$P_{in}(x, y) = \lim_{\varepsilon \to 0} \frac{1}{2\pi} \int_0^{2\pi} \frac{\partial}{\partial \theta} O(x + \varepsilon\cos\theta, y + \varepsilon\sin\theta) \, d\theta \quad [3]$$

ε: a radius of region

Equation (3) is used to calculate the Poincare Index in the case of a circular region, and may be extended to the case of any closed curve as well as a circle. Referring to FIG. 10b, it is well known that the Poincare Index with respect to the core is a ½, while Poincare Index with respect to the delta is −½. Using Equation (3), each point of the fingerprint region is found and then the Poincare Index of each point is calculated, so existence of the core and the delta and their positions can be found.

If regions around the core and the delta are damaged, in other words, the core and the delta appear in the regions with poor qualities, the positions of the core and the delta cannot be exactly found by the Poincare Index. To solve the problem in this case, the Equation [3] is applied by expanding the scope of the regions for calculating the Poincare Index. This method is able to find regions where the core and the delta are located. (This is due to a fact that the Poincare Index is a constant regardless of the scope of the region including the core and the delta, as shown in FIG. 10b and Equation [3]).

At step 55, the positions of the core and the delta are temporarily determined from the positions or regions extracted at step 54, and the determined positions are set as initial parameters to the core or the delta in a ridge orientation model. At the step 55 of setting an initial ridge orientation model, the ridge orientation model $O_m(Z)$ is set according to following Equation [4] by using the property that ridge directions are changed by π and −π in the core and the delta, respectively.

$$O_m(Z) = O_0 + \frac{1}{2}\sum_{k=1}^{K} g_k(\arg(z-z_k); C_{k,1}, C_{k,2}, \cdots, C_{k,l}) \qquad [4]$$

where $$g_k(\theta) = C_{k,l} + \frac{\theta - \theta_l}{2\pi/L}[C_{k,l+1} - C_{k,l}], \theta_1 \le \theta \le \theta_{l+1}$$

$$\theta = \arg(z-z_k); \quad \theta_{k+1} - \theta_k = \frac{2\pi}{L}; \quad C_{k,l} = g_k(\theta_1)$$

In Equation (4), z is a complex value (x+yi) representing a single arbitrary position in a two-dimensional region, and $z_k$ is a complex value representing the position of the core or the delta. Further, $O_o$ is an orientation value when z is infinite, K is the total number of cores or deltas, and L is a positive integer. In Equation 4, values for determining the ridge orientation model are $O_o$, $C_{k,l}$, $z_k$. Here, the $O_o$ is 0(zero) in the initial ridge orientation, and $C_{k,l}$ is calculated by Equation [5].

$$C_{k,l} = -\frac{\pi}{2} - \theta_l, z_k \text{ is a delta}, \qquad [5]$$

$$C_{k,l} = \frac{\pi}{2} + \theta_l, z_k \text{ is a core},$$

In the above description, K, the total number of cores or deltas, contains a core or delta, which does not exist in the fingerprint region. The initial position of a core or delta existing in the fingerprint region is determined as the position, or a single arbitrary point or a center in the region temporarily calculated at step 54.

Further, the positions of the core or the delta, which does not exist in the fingerprint region, are calculated using a fact that only zero, one, or two cores and deltas exist in a finger. In addition, considering the limited size of a finger, the initial positions of core or the delta outside the image (acquired fingerprint image) in Equation [6] is set as one point outside the image, but not as one point deviating from the restricted size of the finger. The temporary positions of the core or the delta not existing in the fingerprint are calculated using Equations [6] and [7]. In Equation [6], K and $z_k$ are the number and the position of the core or delta, respectively, as calculated above.

$$O_{m'}(z) = \frac{1}{2}\sum_{k=1}^{K} g_k(\arg(z-z_k)) \quad \text{where} \qquad [6]$$

$$g_k(\arg(z-z_k)) = -\frac{\pi}{2} - \arg(z-z_k), \text{ if } z_k \text{ is a delta},$$

$$= \frac{\pi}{2} + \arg(z-z_k), \text{ if } z_k \text{ is a core},$$

In Equation [6], z is a complex value of (x+yi) representing a single arbitrary position in a two-dimensional region, and $z_k$ is a complex value representing the position of the core or the delta.

Further, an error is defined as Equation [7], and the core or delta position having a minimum error is calculated using a steepest descent method. In the optimizing process of minimizing the error obtained by Equation [7], Each of the positions of the core or the delta within the fingerprint region (image) and the number of the core or the delta is a constant, and only a position of the core or the delta outside the fingerprint region is determined through the minimum error optimization process as a variable.

$$\langle O_e^2 \rangle = \int_R (O(z) - O_{m'}(z))^2 dz \qquad [7]$$

In Equation (7), R is a region with a quality higher than a predetermined threshold.

$z_k$ determined at step 55 are used as initial values in the error minimizing process to be executed at following step 56. In other words, they are position candidates for finding the more exact position of the core or the delta at following step 56.

Figure 11A:
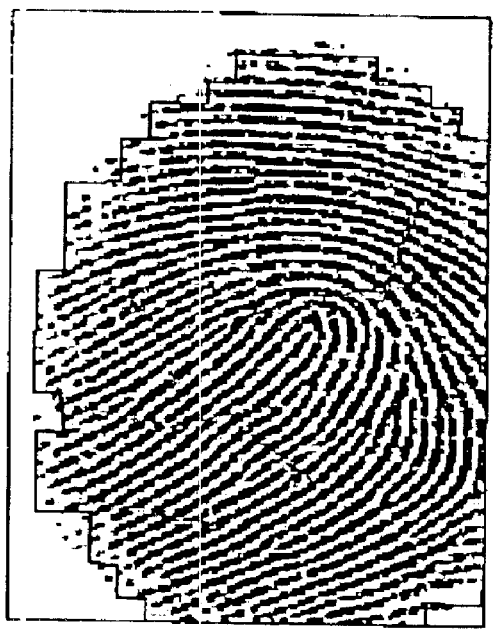
FIG. 11a is a view showing a fingerprint image having a core in a center part.
Figure 11B:
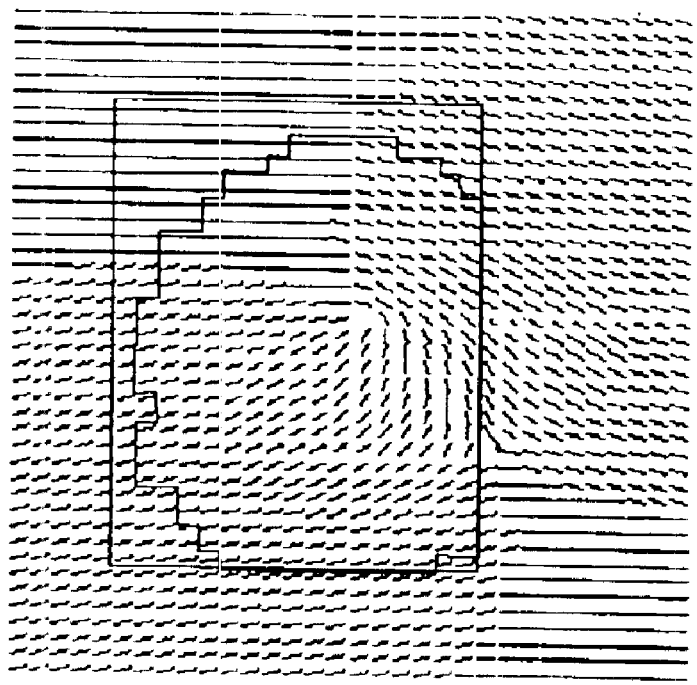

FIGS. 11a and 11b are views showing an example of the initial ridge orientation model of this invention. A fingerprint image having the core in its center part as shown in FIG. 11a is processed as the initial ridge orientation model, as shown in FIG. 11b.

At step 56, a ridge orientation function is calculated using Equation [4], [5], [8] and parameters in Equation [4] is calculated with a minimum error between the ridge orientation values of the ridge orientation model and regions with qualities higher than a predetermined threshold.

The detailed description is as follows. The ridge orientation function is calculated by using the orientation values of regions, which satisfy the condition that they are the fingerprint regions and have qualities higher than the predetermined threshold at step 53. The parameters in this function are calculated with the minimum error between these orientation values and orientation values of the ridge orientation model (Equation [4]). As one method of finding the parameters having a minimum error, the error is defined as Equation [8] and then the parameters with the minimum error are found using a steepest descent method.

$$\langle O_e^2 \rangle = \int_R (O(z) - O_m(Z))^2 dz \qquad [8]$$

In Equation [8], R is a region with a quality higher than a predetermined threshold.

At step 57, the ridge orientation values in all regions are calculated using the ridge orientation function obtained at step 56, and the final positions of the core and delta are determined as the core and delta parameters of the ridge orientation function. Further, the parameters are stored as feature data of the fingerprint, and can be used to classify and match fingerprints.

As described above, the present invention provides a method for extracting fingerprint feature data (ridge orientation, position of core and delta position), which is advantageous in that it can exactly extract the feature data of a fingerprint even in regions having a rapid variation in a ridge orientation, such as a core and a delta, by using a ridge orientation model. Further, the method of the present invention is advantageous in that even if a region with poor quality such as a cut, scar or wrinkle is large, it can exactly calculate the ridge orientations at these regions using the remainder of the ridge orientations except orientations of these regions. Further, the method of this invention may extract the exact ridge orientation at any point from ridge orientation values calculated according to regions. Moreover, in the method of this invention, the ridge orientations at all positions can be calculated from the ridge orientation function based on the ridge orientation model (Equation [4]), such that the ridge orientation information of an entire fingerprint image is compactly represented as a few parameters forming a ridge orientation function. Additionally, the parameters can be utilized as the feature data in the process of fingerprint classification and fingerprint recognition.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for extracting fingerprint feature data using a ridge orientation model, comprising:
    dividing a digital fingerprint image of a predetermined format into a plurality of regions, each region with a predetermined size;
    calculating ridge orientations in the regions;
    calculating qualities of ridges according to regions;
    separating the fingerprint image into a fingerprint region and a background region according to the calculated ridge qualities;
    extracting at least one position of at least one core or delta in the fingerprint region;
    determining a candidate position of a core or a delta outside the fingerprint region and a candidate position of each of the at least one core or delta in the fingerprint region from the extracted at least one position of the at least core or delta in the fingerprint region;
    setting the determined candidate positions both in and outside the fingerprint region as initial parameters of a ridge orientation model;
    setting a quality threshold for fingerprint regions;
    calculating parameters of a ridge orientation function by minimizing errors between ridge orientation values of the ridge orientation model and ridge orientation values of fingerprint regions with quality higher than the quality threshold;
    calculating ridge orientation values in all regions based on the ridge orientation function; and
    deciding at least one final position of the at least one core or delta in the fingerprint region from one or more of the parameters of the ridge orientation function.

2. The method according to claim 1, wherein
    the ridge qualities are calculated from a difference between a gray level difference of ridge orientation with a minimum gray level difference, and a gray level difference of ridge orientation with a maximum gray level difference, and
    the fingerprint image is determined as a fingerprint region if both a gray level difference in a longitudinal orientation of ridges and a gray level difference in a lateral orientation of ridges are higher than a gray threshold, and is determined as a background region if both the gray level difference in the longitudinal orientation of ridges and the gray level difference in the lateral orientation of ridges are lower than the gray threshold.

3. The method according to claim 2, wherein the ridge orientation with the minimum gray level difference is determined to be the longitudinal orientation of the ridges, and the ridge orientation with the maximum gray level difference is determined as the lateral orientation of the ridges.

4. The method according to claim 1, wherein if a region surrounded by fingerprint regions is calculated to have a ridge quality corresponding to the background region, the region surrounded by fingerprint regions and having quality corresponding to the background region is processed as a fingerprint region.

5. The method according to claim 1, wherein the at least one position of the at least one core or delta is extracted by calculating a Poincare Index with respect to each point within a scope of the fingerprint region.

6. The method according to claim 5, wherein extracting at least one position of at least one core or delta in the fingerprint region further comprises expanding the scope and calculating the Poincare index with respect to each point within the expanded scope until the at least one position of the at least one core or delta is extracted.

7. The method according to claim 1, wherein the candidate position of the core or delta located outside the fingerprint region is determined using the following Equation, $$O_{m'}(z) = \frac{1}{2}\sum_{k=1}^{K} g_k(\arg(z - z_k)) \quad \text{where}$$

$$g_k(\arg(z - z_k)) = -\frac{\pi}{2} - \arg(z - z_k),$$

$z_k$ for a delta candidate position, $$= \frac{\pi}{2} + \arg(z - z_k),$$

$z_k$ for a core candidate position, and
    z is a complex value (x+yi) representing a single arbitrary position in a two-dimensional region, and $z_k$ is a complex value representing the candidate position.

8. The method according to claim 7, wherein the candidate position is determined by optimizing an error of the following Equation in a region R having a ridge quality higher than a predetermined minimum, using a steepest descent method, $$\langle O_e^2 \rangle = \int_R (O(z) - O_{m'}(z))^2 dz.$$

9. The method according to claim 1, wherein the initial ridge orientation model is set by the following Equation, $$O_m(Z) = O_0 + \frac{1}{2}\sum_{k=1}^{K} g_k(\arg(z - z_k); C_{k,1}, C_{k,2}, \cdots, C_{k,l}$$

where $$g_k(\theta) = C_{k,l} + \frac{\theta - \theta_l}{2\pi/L}[C_{k,l+1} - C_{k,l}], \theta_l \leq \theta \leq \theta_{l+1}$$

$$\theta = \arg(z - z_k); \quad \theta_{k+1} - \theta_k = \frac{2\pi}{L}; \quad C_{k,l} = g_k(\theta_1),$$

$$C_{k,l} = -\frac{\pi}{2} - \theta_l, z_k \text{ for a delta candidate position,}$$

$$C_{k,l} = \frac{\pi}{2} + \theta_l, z_k \text{ for a core candidate position,}$$

and
    $O_o$ is "0", z is a complex value (x+yi) representing a single arbitrary position in a two-dimensional region, $Z_k$ is a complex value for representing each of the determined candidate positions in turn, K is the total number of cores and deltas, and L is a positive integer.

10. The method according to claim 1, wherein the ridge orientation function is determined by optimizing an error of the following Equation in each region R with a ridge quality higher than a predetermined minimum, using a steepest descent method, $$\langle O_e^2 \rangle = \int_R (O(z) - O_m(Z))^2 dz.$$

* * * * *